April 21, 1959  H. KIETZ  2,883,642
ECHO SOUNDING RECORDER
Filed Jan. 18, 1954

Inventor
Hans Kietz

2,883,642
ECHO SOUNDING RECORDER

Hans Kietz, Bremen, Germany, assignor to Atlas-Werke Aktiengesellschaft, Bremen, Germany Application January 18, 1954, Serial No. 404,511

11 Claims. (Cl. 340—3)

This invention relates to recording apparatus for measuring the length of short time intervals particularly apparatus adapted for ascertaining depths by sound pulses, recurring electric impulses for the excitation of the sound transmitter being generated in synchronism with the periodic movement of the recording element.

The object of the invention is an improved means for timing the emission of sound pulses in relation to the momentary position of a recording element, more especially to the tip of a recording stylus.

Another object is the exact timing of the emission of sound pulses at the beginning of the successive sounding intervals in recording apparatus making use of a plurality of recording stylii sweeping over the record paper in succession.

A still further object is to ensure correct timing of the sound pulses emitted independent of a variation of the length of wire stylii by abrasion or differences in positioning them on the carrier imparting movement to them.

Determination of depths and distances by means of sound pulses implies measuring the time interval between the emission of a signal and the return of its echo reflected by the body the distance of which is to be determined. The time elapsed, being a measure of the distance, is recorded by means of a recording device comprising a marking stylus fitted to a uniformly rotating arm, a uniformly revolving belt, or similar means, and swept across a recording chart on a part of its path. On arrival of the echo the stylus passes a current to the chart and makes a mark on it. The emission of the signal serves as a datum time for the interval to be measured and is arranged to be a small, predetermined time in advance of the marking stylus passing the zero line of the graduation of the chart paper. The keying of the sound emitter has been effected hitherto by means of contacts operated by a cam fitted to the carrier of the marking stylus or to the driving gear of the same, by sliding contacts or the like. Also, the sliding brush feeding the recording current to the marking stylus, has been employed for this purpose.

In order to obtain exact recordings of the depth, it is absolutely necessary that the time lag between the emission of the signal and the passing of the stylus through the zero line of the scale graduation on the chart paper does not depart from the correct value. Provided that the driving gear is running uniformly at the prescribed speed, irregularities of the time lag may be caused by changes in the mechanical links between the keying contact effecting the emission of the signal and the marking stylus, for instance by lost motion in the connecting gear, nonuniform stretching of the revolving belt, or the like. Moreover, changes may be caused by wear and tear of the mechanical and electrical means, as cams, keying contacts, etc., and by wear of the marking stilyus if, as is frequently the case, this stylus consists of a wire resiliently touching the recording chart and makes an acute angle with the direction of motion. These difficulties will be multiplied, if more than one stylus on a common carrier are employed and several signals are emitted during one revolution of the carrier of the marking stylii. In this case, each stylus is associated with a keying contact, the operation of which has to precede the passing of the respective marking stylus through the zero line of the scale graduation by a predetermined time interval being exactly the same for all the stylii. Even if a correct setting has been made, this will soon get lost due to the causes cited above, and depth differences will be apparent between the marks made by the individual stylii.

Thin invention precludes the necessity of making repeated delicate adjustments of contacts and the disadvantages accruing from faulty adjustments, by using the tip of the recording stylus or stylii in a depth recorder for causing the emission of a signal at the beginning of the measuring period by electrical means. The marking stylus is either simultaneously or alternately part of two different circuits, that conducting the recording current, and that causing the emission of a signal.

By the arrangement according to this invention, correct timing of the emission of the signal relative to the scale graduation on the chart paper is assured even when exchanging the marking stylus against a new one. A more comprehensive understanding of the invention will be obtained by reference to the accompanying drawings in which Fig. 1 represents a diagrammatic view of a recorder embodying the invention;

Figure 1:
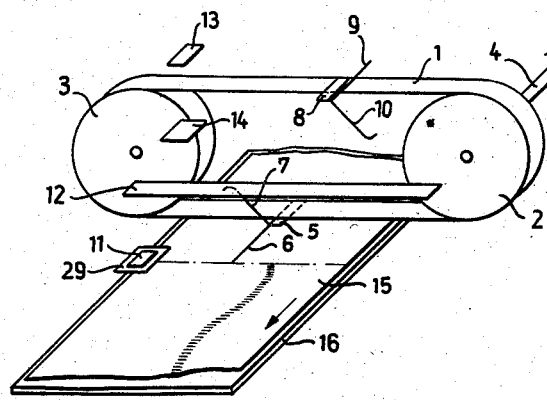

The device shown in Fig. 1 registers depths in two ranges of 0–100 and 100–200 meters, which can be selected by means of a selector switch 28. When using the first range, a signal is emitted each time when a marking stylus is passing through the zero-line of the scale graduation or shortly before, whereas emissions will be advanced by a time corresponding to 100 meters when using the second range. One revolution of the belt corresponds to 500 meters. Signals are emitted at time intervals corresponding to 250 meters.

An endless belt made of rubberized fabric runs over two pulleys 2 and 3, the first of which is driven at constant speed by an axis 4. Marking stylii in form of resilient wires 6, 9, which are connected to sliding brushes 7, 10, likewise in the form of resilient wires, are fitted to laterally protruding holders 5, 8 dividing the length of the belt into two equal halves. For a part of their path the marking stylii travel across a strip of electro-sensitive chart paper 15 coated with a layer of a suitable semiconductor such as lead thiosulphate. This layer disintegrates when an electric current is passed through it, whereby visible markings are generated. The recording strip 15 slowly moves over a metal plate 16 in the direction of the arrow. Plate 16 serves for returning to ground the current passing from the marking stylus to the paper. In two places along its path, one coinciding with the beginning of its traverse across the recording strip 15, the other advanced by approximately the width of the strip, each of the marking stylii 6, 9 slides over short contact pieces 11, 13, the brush wires 7, 10 engaging simultaneously the longer contact bars 12, 14. The slide bar 12 is long enough to maintain engagement between it and the brush wires 7, 10 during the entire travel of these across strip 15.

Figure 2:
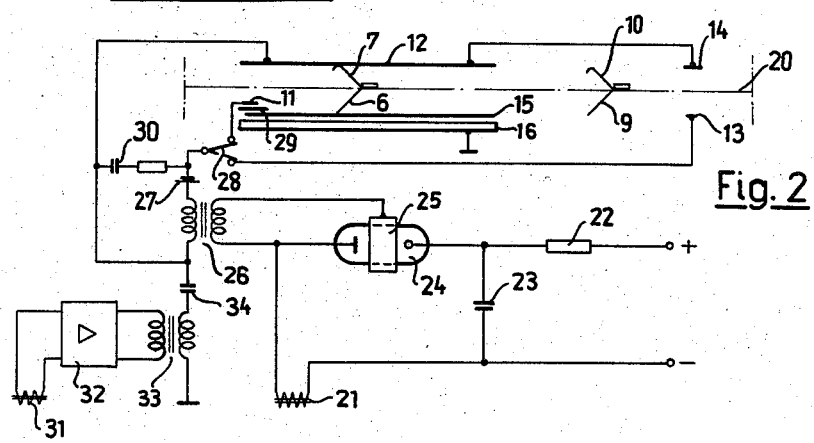
Fig. 2 shows a schematic circuit diagram for the arrangement shown in Fig. 1.

The circuit arrangement is shown in Fig. 2. The holders of the marking stylii move along the dot-dash line 20, being the straight-line development of their revolving path. A magnetostrictive oscillator 21 is provided for the emission of the signal. It is actuated by the abrupt discharge of a condenser 23 through its winding which is controlled by a gas-discharge tube 24. Condenser 23 is continuously charged through a resistor 22. The tube 24 is ignited by impressing a voltage pulse on the external electrode 25, as follows:

With switch 28 in the position shown on the drawing and with sliding wire 7 in contact with bar 12, the tip of the marking stylus 6 on engaging contact 11, closes the primary circuit of the transformer 26 containing the source of current 27. When the tip of the marking stylus 6 moves from over contact 11, the current in the primary is interrupted suddenly and a potential pulse originates in the secondary winding of the transformer 26, which is impressed on the ignition electrode 25. The time interval between the emission of a signal and the moment at which the marking stylus 6 passes through the zero line of the recording chart is independent of the length of the marking stylus or of the point where it is fixed to the belt. There is described here only the action of marking stylus 6 associated with sliding wire 7, the action of marking stylus 9 associated with brush wire 10 being the same in principle. In order to measure depths greater than 100 meters the position of selector switch 28 is changed from that shown in the drawing. The signal is then emitted earlier, when the circuit established through 14, 7, 6, 13 is broken, the time relation between the emission and the entering of the stylus on the chart paper being likewise independent of the length of the marking wire or of its place of attachment to the belt 1.

A sheet of insulating material 29 prevents contact between 11 and 15, if necessary.

A series connection 30 of a condenser and resistor suppresses the break spark of the primary circuit of transformer 26.

The echo returning some time after the emission of the signal is received by an electro-acoustic transducer 31 and amplified in the amplifier 32 producing a potential across the secondary of transformer 33, which is impressed between ground and the slide bar 12 with a condenser 34 interposed. Current is collected from bar 12 by brush wires 7 or 10 and conducted to the chart paper by the corresponding stylii 6 or 9 producing a marking on it and returning to ground through lead 16.

Figure 3:
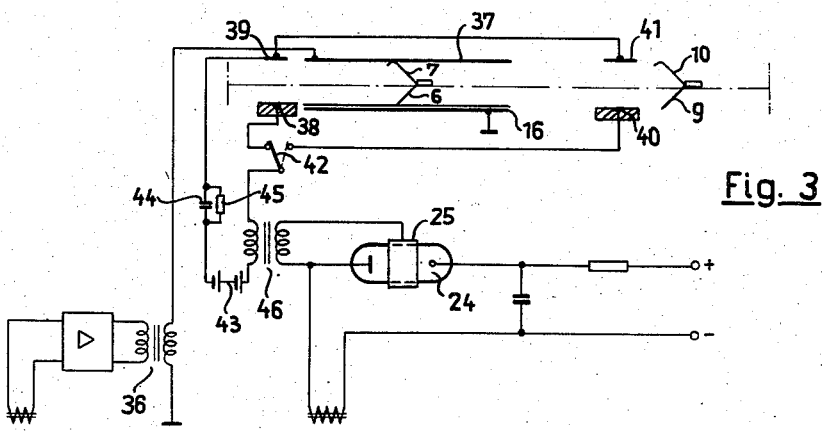
Fig. 3 shows a schematic circuit diagram for a modified arrangement.

Fig. 3 shows another circuit arrangement in which the circuit starting the emission and that conducting the recording current are completely separated.

With selector switch 42 in the position shown in full on the drawing, the tip of the marking stylus 6 and the brush wire 7, for instance, close the circuit of a current source 43 when bridging the contacts 38, 39. Condenser 44 is charged through the primary of transformer 46 which results in the induction of a voltage pulse in the secondary. This pulse is impressed on the ignition electrode 25 of the gas discharge tube 24. When the sliding wire 6 moves from over contact piece 38, the circuit is opened and condenser 44 is discharged through the resistor 45. The emission of the signal is advanced by changing over switch 42. The circuit of the current source 43 is then closed by the sliding wires bridging contacts 40, 41.

On the reception of an echo the recording current generated in the secondary of transformer 36 is conducted to a slide bar 37 whence it passes to the brush wires 7 or 10 respectively. Provided that the chart paper has sufficient conductivity, the circuit shown in Fig. 3 can be altered to cause emission of a signal when the marking stylus enters on the chart paper. For this purpose the wire leading to the contact piece 38 is instead connected to 16. A paper with a thin metal coating can be used, on which the recording current produces a marking by burning away the coating. For the adjustment of the moment of the emission a small adjustable insulating sheet covering the entering border of the chart may be provided, on leaving, which the marking stylus makes contact with the chart paper.

The signal may also be caused to be emitted by a marking stylus made of magnetic material and sliding over the poles of a magnet fitted with an induction coil.

The actual emission of the signal may be retarded by a fixed or variable time interval relative to the pulse generated by the tip of the stylus by means of an electronic delay circuit. This permits arranging the pulse generating contacts at any convenient place along the belt or to vary the position along the depth scale of the range recorded by means of a variation of the time-lag.

This invention may also be used to advantage with recording devices based upon a non-periodic though uniform motion of the marking stylus across the chart. The invention can also be utilized for recording devices in which the marking stylus executes an oscillating motion and recordings are made only during the forward movement which has uniform speed.

What I claim is:

1. In an echo sounding apparatus for recording distance on a recording chart, a control circuit for effecting the emission of a sound pulse, a marking stylus having a tip for making marks on the recording chart on the reception of an echo of the pulse, means for moving said stylus at a uniform speed along a path closed in itself, part of this path traversing the chart, a plurality of normally open contact means adapted to be selectively introduced into the control circuit and arranged along the path of the tip of the stylus and close when engaged by said tip, and a selector switch for connecting any of said contact means into said control circuit for effecting the emission of the sound pulse.

2. In an echo sounding apparatus for recording distance on a recording chart, a control circuit for effecting the emission of a sound pulse, a plurality of marking stylii having tips for making marks on the recording chart on the reception of an echo of the pulse, means for moving said stylii at a uniform speed along a path closed in itself, part of this path traversing the chart, a plurality of normally open contact means adapted to be selectively introduced into the control circuit and arranged along the path of the tips of the stylii and closed when engaged by said tips and a selector switch for connecting any of said contact means into said control circuit for effecting the emission of the sound pulse.

3. In an echo sounding recorder, a circuit controlling the emission of a sound pulse, a stylus, means for moving the stylus at constant speed along a path closed in itself, a graduated semi-conductive chart paper over which said stylus traverses in its path, a collector bar in the control circuit a brush adapted to bear against the collector bar and being connected to said stylus, said stylus having a tip adapted to slide over said chart paper, a contact arranged along the path of the stylus tip forming with said brush, an opening in the control circuit, said opening being closed by said stylus tip passing through a definite position in relation to said contact, whereby there is obtained a constant time difference between the emission of the sound pulse and the passing of the tip of the stylus through a certain graduation line on the chart independent of the length and adjustment of the stylus.

4. In an echo sounding recorder, a control circuit when closed effecting the emission of a sound pulse, a stylus having a marking tip, a recording chart, means for moving the marking tip of the stylus along a path which traverses the recording chart, a plurality of open contact means adapted to be selectively introduced into the control circuit and in the path of the marking tip of the stylus, said contact means closing when engaged by the marking tip of the stylus, and means for introducing any one of the contact means into the control circuit, whereby when the contact means introduced into the circuit is closed by the tip of the stylus, the admission of a sound pulse is effected.

5. In an echo sounding recorder including a recording chart, a moving stylus traversing the chart and having a marking tip for recording echoes on the chart, and a signal transmitter for producing the pulses whose echoes are recorded; a control circuit for energizing the transmitter comprising a power source, and a normally open contact means in the path of the stylus marking tip and adapted to be closed by the tip to close the control circuit and energize the transmitter.

6. A device as defined in claim 5, further characterized by additional contact means in the path of the stylus and closed by the stylus marking tip, and means for substituting the additional contact means into the control circuit for the first name contact means.

7. In an echo sounding recorder including a recording chart, a moving stylus traversing the chart and having a marking tip for recording echoes on the chart, a slide wire connected to and moving with the stylus and electrically connected thereto, and a signal transmitter for producing the pulses whose echoes are recorded by the stylus on the chart; a control circuit which energizes the transmitter immediately upon opening comprising a power source, and a pair of spaced apart contacts one in the path of the tip of the stylus and the other in the path of the slide wire and positioned to be engaged simultaneously by the wire and tip to close the control circuit, the contact engaged by the tip being smaller than the other causing the tip to move off that contact to open the circuit before the wire moves off the other contact.

8. In an echo sounding recorder including an electro-sensitive recording chart, means for moving said chart in a first direction, at least one electrically conductive stylus, means for moving said stylus in a direction transverse to the direction of motion of said chart, said stylus being arranged to have the tip thereof positioned substantially in the plane of said chart during a portion of the stylus travel and in contact therewith during its motion thereacross, a sliding brush connected to said stylus and movable therewith, a first pair of contact elements comprising a contact bar and a contact surface, said contact bar extending in the direction of stylus travel and adapted to be engaged by said sliding brush during said portion of the stylus travel, said brush and stylus forming an electrical connection between the elements engaged thereby, said contact surface positioned opposite said contact bar substantially in the plane of said chart and adapted to be engaged by the tip of said stylus while said brush engages said contact bar, said contact surface being electrically insulated from said chart and having a dimension in the direction of stylus travel substantially smaller than that of said contact bar, said contact surface terminating in a line transverse to said direction of stylus travel, said line having a first predetermined positional relationship to a reference line on said chart, a signal transmitter circuit coupled to said contact bar and said contact surface respectively, said transmitter circuit adapted to be energized by the transient incident to breaking said circuit when said stylus tip traverses the terminating line of said contact surface, a signal receiver circuit coupled to said contact bar, said receiver circuit adapted to pass a current through said stylus tip for marking said electro-sensitive chart upon receipt of an echo signal, whereby the time interval measured on said chart is independent of the dimensions or the position of said stylus.

9. The apparatus of claim 8 and further comprising a second pair of contact elements adapted to be engaged by said stylus and said brush respectively, the element engaged by said stylus being dimensionally smaller in the direction of stylus travel than the other element of said second pair, said smaller element terminating in a line transverse to the direction of stylus travel, said last recited line having a second predetermined positional relationship to said reference line, means for coupling the larger contact element of said second pair to said contact bar, and a selecting switch connected to said transmitting circuit for selectively coupling the latter to said contact surface or to the smaller contact element of said second pair.

10. The apparatus of claim 8 wherein said stylus is positioned on an endless belt supported by two rotating pulleys, and means for applying a motive force to one of said pulleys.

11. In an echo sounding apparatus for recording distances on a recording chart, a control circuit for effecting the emission of a sound pulse when closed, a marking stylus moved across the recording chart in inclined position with its tip trailing behind in sliding contact with the recording chart for making marks on said chart on the reception of an echo of the pulse, means for moving said stylus at a uniform speed along a path closed in itself, part of this path traversing the chart, a brush connected to said stylus and moving in unison with it, a slide bar engaged by said brush for applying received echo pulses to the stylus, a selector switch, a plurality of normally open contact pairs adapted to be selectively introduced into the control circuit by said selector switch and arranged along the path of the stylus and the brush respectively to be bridged temporarily by the stylus brush combination, closure of each contact pair occurring simultaneously with the engagement of a contact by said stylus tip, whereby the timing of the pulse transmission with reference to the traverse of the stylus tip across the recording strip is constant for each position of the selector switch and in particular independent of variations of the length of the stylus as caused by wear or replacement of the stylus.

References Cited in the file of this patent
UNITED STATES PATENTS

| | | |
|---|---|---|
| 2,591,138 | Cooley | Apr. 1, 1952 |
| 2,597,199 | Stamper | May 20, 1952 |
| 2,610,244 | Wolf | Sept. 9, 1952 |
| 2,614,903 | Stamper | Oct. 21, 1952 |
| 2,633,405 | Nelson | Mar. 31, 1953 |
| 2,715,055 | Fryklund | Aug. 9, 1955 |